Jan. 26, 1943.　　　　L. G. BLACK ET AL　　　　2,309,569
METHOD OF SEPARATING SODIUM SALTS
Filed Nov. 6, 1939　　　3 Sheets-Sheet 1

THE SYSTEM
$Na_2CO_3 - Na_2SO_4 - H_2O$

Inventors
Leroy G. Black
Elliott Bryant Fitch
Henry Bruno Suhr
By Lyon & Lyon
Attorneys

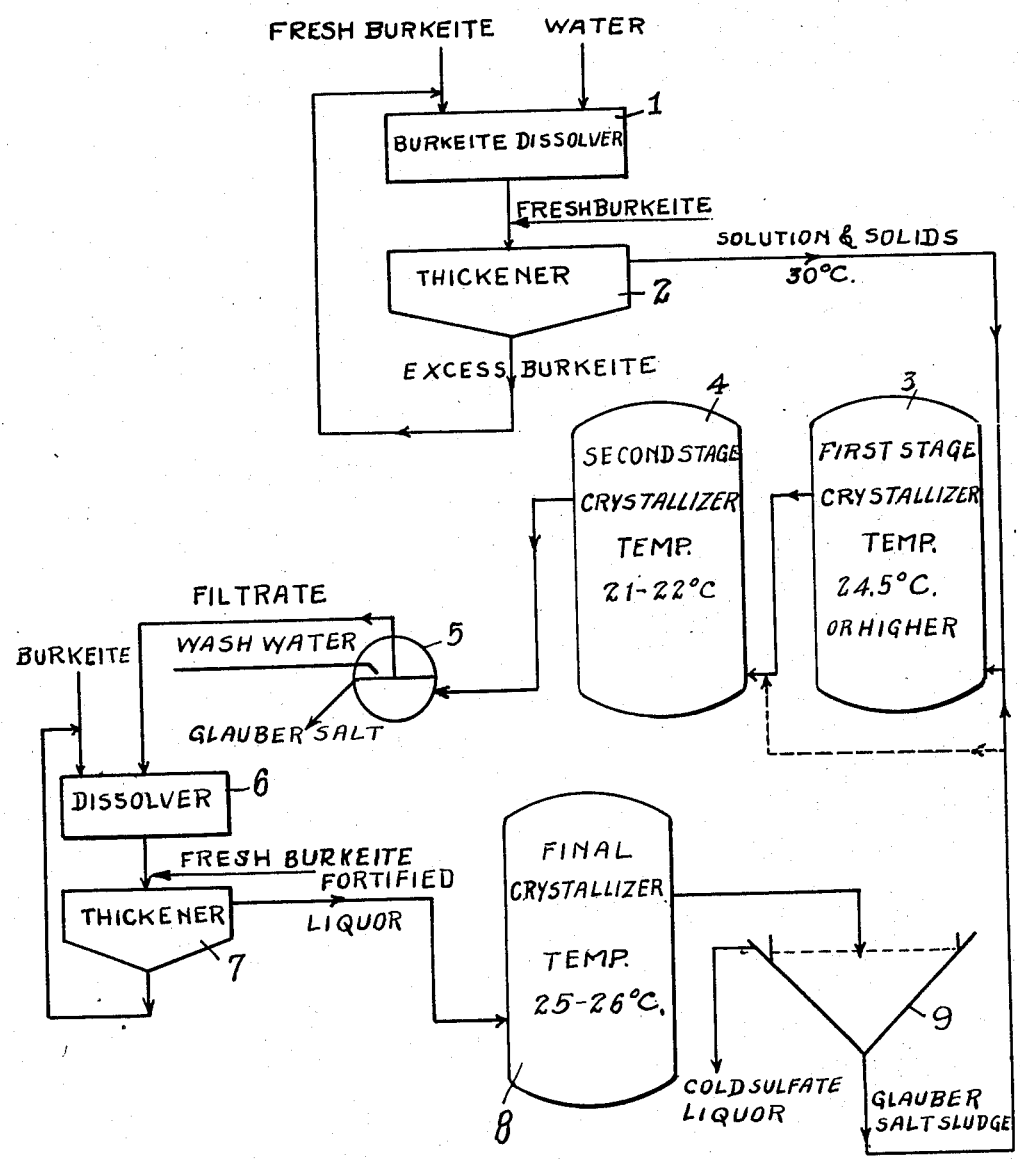

Patented Jan. 26, 1943

2,309,569

UNITED STATES PATENT OFFICE 2,309,569

METHOD OF SEPARATING SODIUM SALTS

Leroy G. Black, Elliott Bryant Fitch, and Henry Bruno Suhr, Trona, Calif., assignors to American Potash & Chemical Corporation, Trona, Calif., a corporation of Delaware Application November 6, 1939, Serial No. 303,050

10 Claims. (Cl. 23—121)

This invention relates to a new and useful method for separating sodium sulphate or sodium carbonate from mixtures, complexes or combinations with each other, alone or in the presence of other salts, while simultaneously producing a mother liquor substantially saturated with Glauber salt, sal soda, and burkeite, and preferably substantially free of sodium chloride. Such complexes may exist either in the form of solutions as in the case of various natural or artificial brines, or in the solid state, as in the case of the double salt burkeite ($Na_2CO_3.2Na_2SO_4$), or as mechanical mixtures of the various salts.

In the evaporation and manipulation of brines, such as those of Searles and Owens Lakes, California, for the recovery of borax and potash, large quantities of such sulfate-carbonate complexes and mixtures are obtained and it is in the utilization of these materials that the process and features of this invention are of special value.

Various processes have been devised for the recovery of values from natural or artificial brines, in which processes the brine is subjected to evaporation. When applied to Searles and Owens Lake brines, the evaporation produces salts from which hydraulic classification will provide sodium chloride, containing small amounts of carbonate and sulfate of sodium, and a sulfate-carbonate complex, containing small amounts of sodium chloride. A sulfate-carbonate complex called burkeite, having the approximate formula $Na_2CO_3.2Na_2SO_4$ is obtained from Searles Lake brine. Likewise, complexes composed of sodium carbonate and sodium sulfate in other proportions, such as $2Na_2CO_3.3Na_2SO_4$, may be precipitated from such brine during evaporation.

While the double salt of the former composition has been termed burkeite in past literature, we wish to include in that classification other similar complexes, such as the last-mentioned composition, which are similar in their characteristics with the true burkeite and may be true double salts or mixed crystals. Throughout the specification and claims, burkeite will be used in its broader sense, unless otherwise identified or limited.

In addition to such complexes, continued high temperature evaporation of Searles Lake, Owens Lake, and similar brines results in the precipitation of a certain quantity of sodium carbonate monohydrate ($Na_2CO_3.H_2O$). These carbonate and sulfate salts, together with a small amount of sodium chloride, may be separated from the bulk of the sodium chloride, when precipitated during evaporation of such brines, by hydraulic classification methods, such as set forth in U. S. Patents Nos. 1,810,181 and 1,873,251. The refining and recovery of pure salts from these and similar mixtures is one of the objects of the present invention.

Sulfate-carbonate mixtures and complexes of this nature have been treated heretofore in a variety of ways for the separate recovery of sodium carbonate and sodium sulfate. One of the most satisfactory methods depends upon fractional crystallization to secure separation of the two salts from solutions and solids containing both. In this method, sodium sulfate is separated from sodium carbonate by manipulating the complex or mixture with water at a temperature in the Glauber salt ($Na_2SO_4.10H_2O$) field. This process applies to the treatment of solids containing sodium sulfate and sodium carbonate in proportions in which the ratio of sulfate to carbonate is greater than that of a solution saturated with burkeite and the decahydrates of the two single salts and containing little or no sodium chloride. By dissolving the complex or mixture in water at a temperature below the transition temperature between Glauber salt, sal soda, and burkeite and providing sufficient of the solids to exceed saturation with Glauber salt, this salt is crystallized or precipitated. In this way, there is simultaneously provided a quantity of Glauber salt and a solution or liquor which contains sodium carbonate and sodium sulfate in proportions of greater carbonate to sulfate ratio than existed in the raw material and than exists in burkeite. This solution may be subsequently treated for the recovery of sal soda by saturating with sodium chloride at an elevated temperature, whereby burkeite is precipitated and the ratio of carbonate to sulfate further increased, and cooling, whereupon a crop of sal soda crystallizes. Maximum recoveries of both Glauber salt and sal soda will be obtained when the sodium carbonate concentration of the liquor or solution remaining after crystallization of Glauber salt is a maximum, i. e., is in the neighborhood of the transition point between Glauber salt, sal soda, and burkeite. It is an object of our invention to provide steps by which optimum liquors for the recovery of sodium carbonate may be obtained in practice.

Another object is the provision of an improved method and means for securing a more rapid conversion of sodium carbonate-sodium sulfate complexes and/or mixtures into Glauber salt, and a solution containing carbonate and sulfate in greater ratio than they exist in burkeite. A further object is to facilitate the crystallization of Glauber salt under conditions which are more favorable to the solid conversion of sodium carbonate-sodium sulfate complexes and/or mixtures into Glauber salt.

The process of the present invention will best be understood from the description of a preferred form or example of the process embodying the invention. For this purpose, we have hereinafter set forth the description of a preferred form of our process, in connection with the accompanying drawings, in which—

Figure 3 is an apparatus flow diagram showing one method and means for carrying out a form of the invention.

Figure 1:
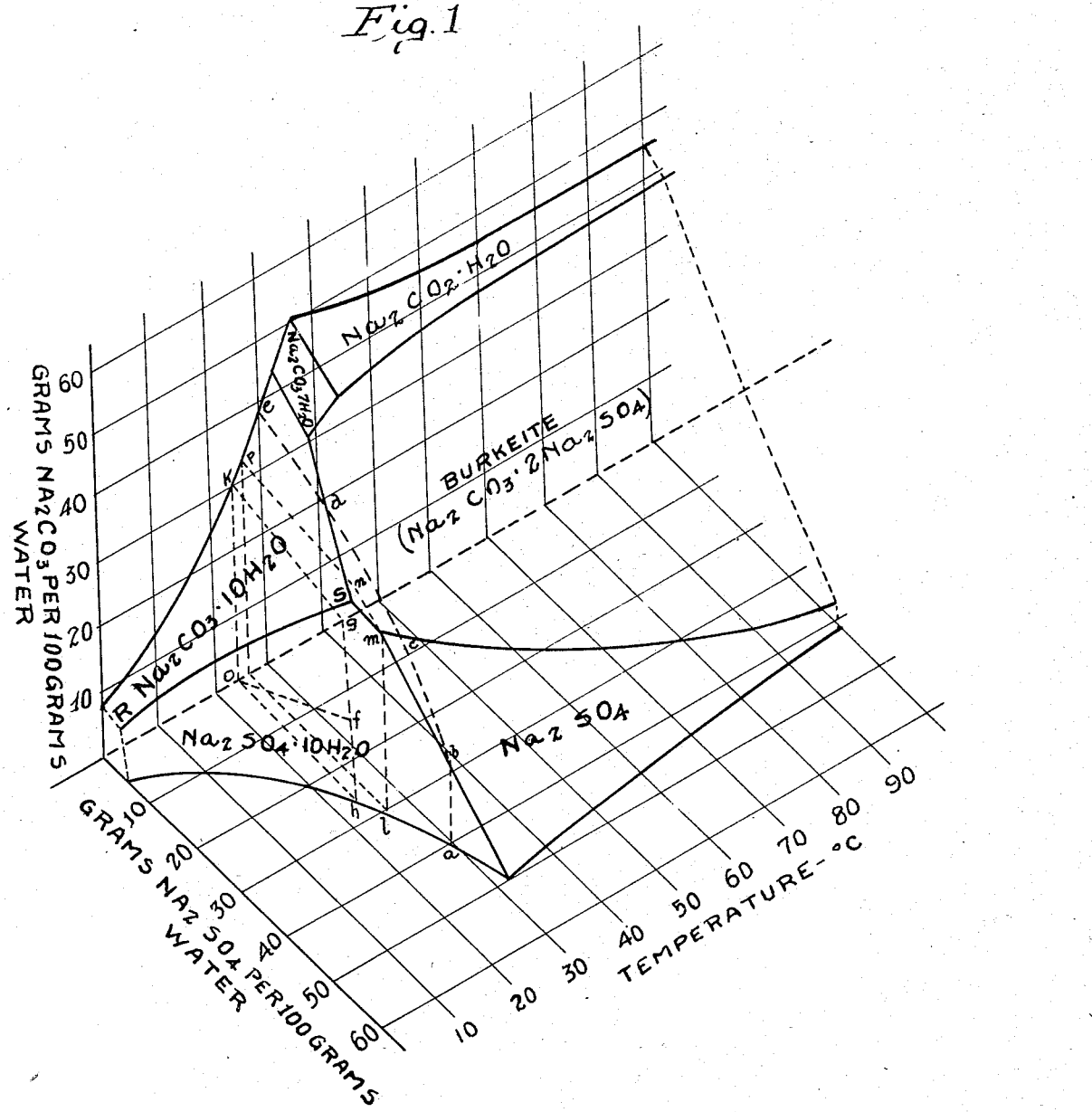
Figure 1 is a polytherm representing the solubility and phase relations for the system $Na_2CO_3$—$Na_2SO_4$—$H_2O$, at all temperatures from 0° C. to 100° C.

Referring, first, to Figure 1 of the drawings, there is represented in the perspective a polytherm of the system sodium sulfate, sodium carbonate and water, upon the outer surfaces or fields of which there are indicated the particular solid phases with which the solutions at the corresponding concentrations and temperatures are saturated. A boundary between the fields represents the field of existence of solutions saturated with the two adjacent phases. The intersection of three boundaries represents the composition of the liquid phase of the invariant system containing the three adjacent solid phases.

The terms "phase," "component," "invariant system," "invariant point," "polytherm," "isotherm," "transition temperature," "transition point," "system," "boundaries," and "fields" herein used are the standard terms well known and well defined in books dealing with phase rule work, such as "The Phase Rule and its Application" by A. Findlay, 1923 (Fifth) edition; "Principles of Physical Chemistry" by Washburn, 1921 edition; "Equilibria in Saturated Salt Solutions," Monograph Series, by W. C. Blasdale, 1927 edition; "The Application of Physico-Chemical Theory" by R. Kremann, translated by H. E. Potts, 1913 edition.

Thus, in Figure 1, the line R—S is the polytherm representing the composition of all solutions saturated with the two salts $Na_2SO_4.10H_2O$ and $Na_2CO_3.10H_2O$, i. e., Glauber salt and sal soda, while the point S represents the composition of the invariant point solution at the temperature of transition of the two single hydrated salts to the anhydrous double salt burkeite, $Na_2CO_3.2Na_2SO_4$. We are aware that the decahydrates of both sodium carbonate and sodium sulfate tend to form a limited series of mixed crystals in solutions containing both salts. However, we have found that this tendency is not great enough to seriously interfere with the operability and usefulness of our process, and does not materially change the diagram.

Figure 2:
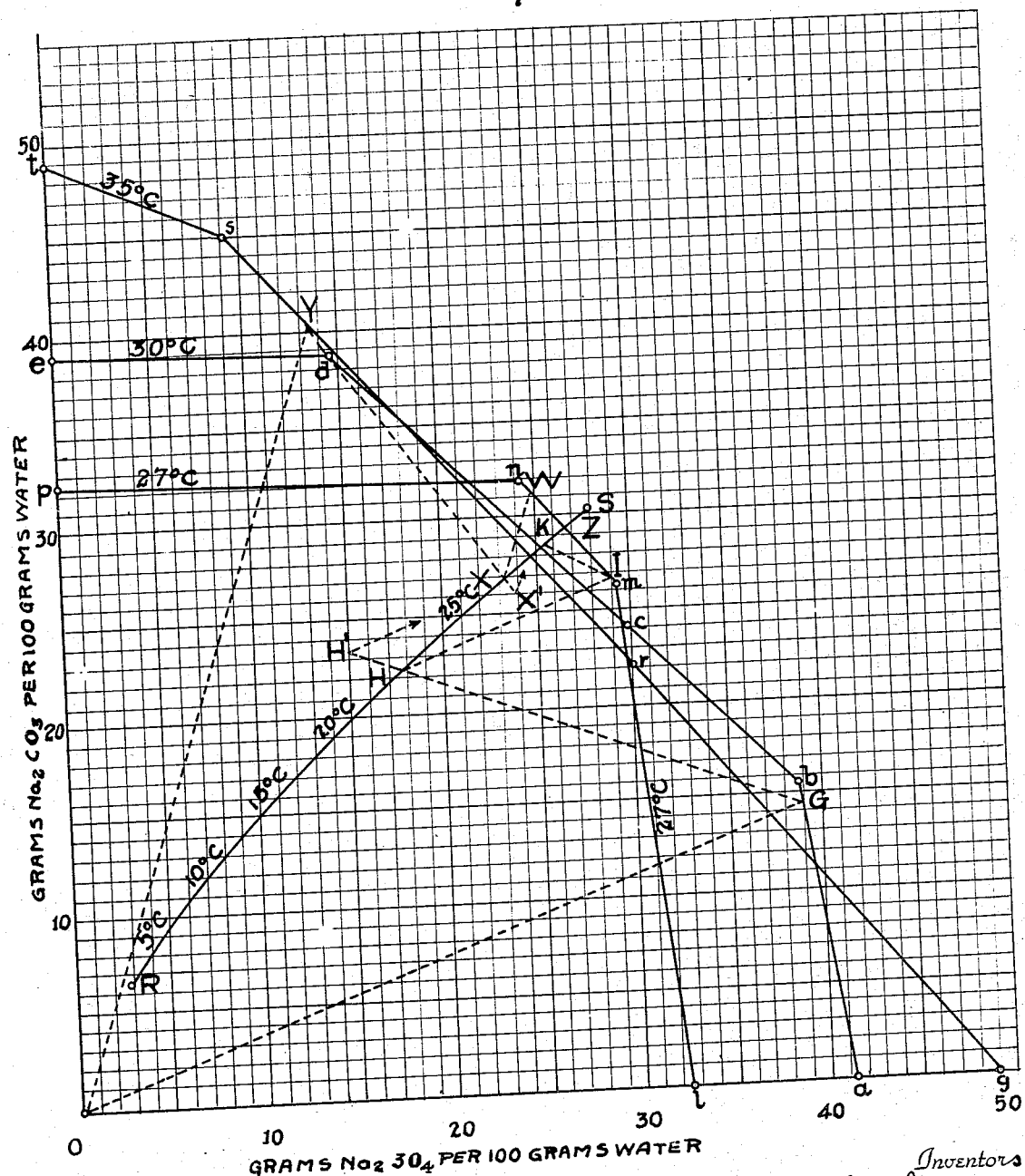
Figure 2 is a diagram of the 27° C., 30° C., and 35° C., isotherms of Figure 1, together with the polytherm representing the compositions of all solutions saturated with sal soda and Glauber salt.

The isotherms at 27° C., 30° C., and 35° C., $l$—$m$—$n$—$p$, $a$—$b$—$c$—$d$—$e$, and $q$—$r$—$s$—$t$, respectively, are plotted on Figure 2. The curve RS of Figure 2 is the boundary between the sal soda and Glauber salt fields of Figure 1 and is the polytherm for all solutions saturated with sal soda and Glauber salt between 0° C. and the transition point between these compounds and the double salt burkeite.

The present invention relates to improvements in certain phases of a more comprehensive process described and claimed in United States Patent No. 1,836,426, which comprehends the recovery of pure sodium carbonate, sodium sulfate, and sodium chloride from complexes or mixtures of these salts. Briefly, the general process embraces the manipulation of sodium carbonate-sodium sulfate complexes or mixtures, which contain a greater ratio of sulfate to carbonate than that of a solution saturated with burkeite and the decahydrates of the two single salts and containing little or no sodium chloride, with water, to produce Glauber salt and a solution containing carbonate and sulfate in ratio greater than exists in burkeite or similar complex, followed by recovery of sal soda from the solution obtained. The prior process also includes certain steps for the recovery of sodium carbonate from complexes and mixtures not suited for the direct recovery of Glauber salt, and for the treatment of other complexes or mixtures to facilitate the recovery of Glauber salt. The present invention aims to provide improvements in those steps of the previous process in which mixtures or complexes of sodium carbonate and sodium sulfate, containing little or no sodium chloride, are manipulated in the Glauber salt field. It is applicable to the same variety of solid salts or solutions thereof as set forth with respect to the corresponding step in Patent No. 1,836,426.

When the complex or mixture is of a suitable composition to permit the recovery of both Glauber salt and sal soda, it is important that the Glauber salt crystallization be carried out under conditions which will leave a solution having a high ratio of carbonate to sulfate, and a high concentration of carbonate. This solution has heretofore been termed cold sulfate liquor and that terminology will be used herein. Preferably, the operation is conducted so as to produce a solution essentially at the transition point between sal soda, Glauber salt and burkeite. In the absence of sodium chloride, this transition temperature is about 26.1° C. Sodium chloride both depresses this transition temperature and decreases the concentrations of the several salts in the solution. Low concentrations of sodium chloride will depress the concentration of sodium sulfate and sodium carbonate in the solutions. Although it is preferable to operate the process in the absence of sodium chloride, small amounts of that salt may be tolerated in practice and it may sometimes be better to accept small amounts of sodium chloride which are associated with the crude salts than to provide additional steps to remove them.

In the prior process, the manipulation to produce Glauber salt and cold sulfate liquor was conducted essentially as a sludge or solid conversion, with water, at a temperature at or somewhat below the transition temperature between sal soda, Glauber salt, and burkeite, i. e., at a temperature within the Glauber salt field. Temperatures of from 22–25° C., for example, were employed. Applied to the dissolution or conversion of true burkeite, $Na_2CO_3.2Na_2SO_4$, at 25° C., the composition of the solution during the process would travel along the line o—f in Figure 1 to the point f on the 25° C. isotherm, at which the solution reaches saturation with Glauber salt. The dissolution of solids containing other ratios of carbonate to sulfate would be represented by lines from the origin O to other points on the line h—g. After reaching a point on the line h—g, the complex continues to dissolve and Glauber salt separates while the solution composition moves along the line h—g toward g. The amounts of water and salts chosen are such that upon the solution composition reaching g. that is, saturated with Glauber salt and sal soda, all of the complex will have been dissolved. The point g, being at 25° C., represents compositions containing slightly less carbonate than the maximum obtainable, i. e., at 26.1° C., but a slightly lower temperature assures keeping the system within the Glauber salt field.

In the operation just described, solid burkeite is placed in an unstable environment, and after point f of Figure 1 is reached said solid burkeite must undergo what might be termed a "solid conversion." In this decomposition the $Na_2CO_3$ of the complex goes into solution, driving the composition of the solution toward point g while the $Na_2SO_4$ of the complex forms $Na_2SO_4.10H_2O$, which precipitates. The exact mechanism of such procedure is unknown, but the complex probably dissolves, followed by reformation of the $Na_2SO_4$ as a solid phase, this time as Glauber salt.

While we have described the cold sulfate liquors produced in past practice as having a composition represented by point g, it has been found in practice difficult to force the sludge to undergo complete decomposition to reach point g. It has been necessary to stop somewhat short of equilibrium conditions (point g) if a batch of sludge is to be cooled and crystallized in a reasonably short time. This is probably due to the fact that, as point g is reached, the solution becomes nearly saturated with respect to $Na_2CO_3$ as well as saturated with $Na_2SO_4$. Hence (as a possible explanation), it may be said that the solution, being essentially saturated with both components of the complex can no longer easily dissolve said complex and cause its decomposition.

Whatever be the true mechanism of this phenomenon, the fact remains that, under practical conditions of batch operation, point g was somewhat difficult to obtain. When the cooling (removal of heat of crystallization of the precipitating Glauber salt) was attempted in a continuous manner even greater difficulties were encountered. In a continuous system, a batch of sludge is first cooled and liquor approximating point g is produced. Then a continuous stream of new burkeite sludge is fed into the equipment, and a continuous stream of Glauber salt and cold sulfate liquor removed. Under these conditions, the major portion of the liquor is always at point g, and very poor conversion of the solid burkeite takes place, despite and actually due to the system being held at 25° C.

It has been our purpose to provide methods by which the formation of a cold sulfate liquor of high carbonate to sulfate ratio and high carbonate concentration may be accomplished more readily on a practical scale.

Our improved process is based upon the joint discoveries that concentrated solutions of sodium carbonate-sodium sulfate mixtures and/or complexes, having a ratio of sulfate to carbonate greater than about unity, can be cooled to temperatures at which they become saturated, or somewhat supersaturated, with sal soda, and a crop of solid Glauber salt will precipitate and can be recovered; and that the remaining mother liquor will dissolve appreciable further quantities of the solids to form a liquor which can also be cooled to crystallize Glauber salt. This sequence of dissolving and cooling crystallization steps when repeated will produce a final mother liquor which has a composition approaching or approximating that of the optimum solution at the transition point S between sal soda, Glauber salt, and burkeite.

In this new operation, only solutions which are relatively quickly produced by contacting the solids and solvent are handled and consequently the manipulation is much quicker than the old sludge conversion process. While the advantage of the sludge conversion process, that only a single step is employed, is lost by our new process, the overall gain is large since the time required to produce optimum final liquors is materially reduced. We also find that a thin sludge of solids can be converted satisfactorily in our new step-wise process, especially if the cooling steps are carried out in stages, in the first of which saturation with respect to sodium carbonate is not reached. This constitutes a further advantage, since higher carbonate concentrations of the solution are obtained and also a larger crop of Glauber salt. While this is advantageous, for the sake of simplicity of exposition, we will describe the simple case in which the quantity of solids used does not exceed that quantity which represents saturation of the solution with the solids.

The first step of our improved process, therefore, consists in dissolving the complex or mixture of sodium carbonate and sodium sulfate in water. The manipulation is preferably conducted at a temperature somewhat above the transition point between sal soda, Glauber salt, and burkeite, and essentially only that quantity of the solids is added as will go into solution; or excess solids may be added and then separated from the solution before subsequent treatment. Preferably, sufficient solids are used and sufficient time is allowed to provide a saturated solution at the temperature employed, but in practice it may be desirable to operate somewhat under saturation as the time required to reach saturation increases greatly as saturation is approached. The dissolving of solids of this character is represented on Figure 2 by the line OG, which is the solution path for the dissolution of true burkeite, the point G being the composition of a saturated solution thereof. This step of the process is valuable as applied to all complexes or mixtures, substantially free of sodium chloride or containing only small amounts of sodium chloride, the ratio of sodium carbonate to sodium sulfate of which is less than or only slightly greater than unity. It may be employed on complexes which have a carbonate-sulfate ratio greater than that of burkeite, but less than that corresponding to the transition point between sal soda, Glauber salt, and burkeite. In referring to a ratio of sodium carbonate to sodium sulphate of unity in this specification and claims we have reference to a weight ratio.

Preferably, the operation is conducted at that temperature at which the apparent solubility of the solids being treated is greatest, so that there is obtained a solution having a maximum content of the complex. At times, the composition of the complex may be such as to make it incongruently soluble in water. For example, point $f$ of Figure 1 when arrived at by the addition of an excess of burkeite ($Na_2CO_3 \cdot 2Na_2SO_4$)

is not a true saturation point. Truly, some of the excess burkeite should, prior to its removal from the liquid phase, decompose and cause the composition of the liquor to become richer in $Na_2CO_3$ while precipitating some sodium sulfate. However, we have found that these complexes are sluggish and that under practical conditions such changes do not take place readily. To all intents and purposes, therefore, when an excess of burkeite is mixed with water a saturated solution, bearing sulfate and carbonate in the ratio originally present in the complex, or in a ratio not differing greatly therefrom, is obtained. When we speak of "saturated" solutions of these complexes we refer to those obtained within a reasonable time by placing said complex in just sufficient (or in a deficiency of) water to form a concentrated solution. For burkeite mixtures, they will usually be solutions of composition approximating the point at which $Na_2SO_4$ should begin to be precipitated. In cases when a deficiency of water is employed, all or the greater part of the excess solids are removed by suitable means, such as filtration, settling, etc. Of course, this formation of a saturated solution of burkeite is preferably conducted at a temperature where a maximum concentration is obtainable. This temperature will vary to some extent with the composition of the solids but in general will be between the transition point between sal soda, Glauber salt, and burkeite, and 35° C. For true burkeite, $Na_2CO_3 \cdot 2Na_2SO_4$, the preferred temperature is about 30° C., and for the complex $2Na_2CO_3 \cdot 3Na_2SO_4$ it is about 31° C. This step of our process is not restricted to use at these optimum temperatures. Any temperature (at which a "saturated" solution of the solids can be produced) may be used, particularly when certain subsequent steps which secure the dissolution of further solids are employed.

Following the preparation of the solution of the complex, we cool the solution to the temperature at which it becomes saturated with sal soda and Glauber salt. Glauber salt precipitates during this cooling, thereby increasing the ratio of carbonate to sulfate in the solution. It is also possible to supercool this solution with respect to sal soda and thereby recover a larger crop of Glauber salt. Sodium carbonate decahydrate, or sal soda, exhibits an appreciable tendency to supersaturate and the metastable field of supersaturation is of sufficient area under conditions of careful commercial operation to permit the handling of such solutions without releasing the sal soda supersaturation. The permissible degree of supersaturation of sal soda, which determines the temperature to which the cooling to crystallize Glauber salt may be carried, will vary with the particular equipment used, the amount of agitation, the presence or absence of seeds of sal soda, and other factors which affect supersaturation, and must be determined empirically in each particular case. We have found that supercooling the liquor as much as 2–3° C. has been possible, but prefer to use temperatures only about one degree centigrade below the temperature at which the solution is saturated with sal soda. To avoid releasing the supersaturation of sal soda during the Glauber salt crystallization, the system must be kept essentially free from seeds of sal soda, the retention time should be kept short, and the system should not be subjected to undue mechanical shock or stimuli, factors which tend to reduce the area of the metastable field of supersaturation. Although when expressed in terms of temperature the degree of supersaturation of sal soda in this cooling appears relatively small, it represents certain definite advantages of practical magnitude. In the absence of this supersaturation characteristic, cooling would have to be closely controlled so that operation would remain below the monovariant point, whereas actually no such close control is necessary. The additional recoverable Glauber salt represented by 2–3° C. of supercooling amounts to approximately 4–7 grams per 100 grams of solution, and this corresponds to an appreciable percentage of the total Glauber salt obtained.

When a solution of burkeite of composition G (Figure 2) is cooled to about 21.5° C. a cold sulfate liquor of composition H results, Glauber salt being precipitated the while. Upon supercooling about 1.5° C., further quantities of Glauber salt precipitate and the resulting cold sulfate liquor of composition $H^1$ (richer in $Na_2CO_3$ and poorer in $Na_2SO_4$) results. While this trick is of practical value, due to its not being a monovariant point (i. e., it is subject to fluctuations dependent upon operating conditions), we will describe further steps of our improved process as based upon the equilibrium liquor H for purposes of simplification only. Though solution H, for example, is saturated with sal soda and Glauber salt its composition is inferior to solution S, which represents the transition point between sal soda, Glauber salt, and burkeite. This is necessarily true because no solution of burkeite or similar complex can originally contain enough $Na_2CO_3$ and $NA_2SO_4$ so that after crystallization of Glauber salt, the mother liquor will be saturated with sal soda, Glauber salt and burkeite, i. e., exist at the optimum point S. As a result, the mother liquor will not be an optimum solution for the subsequent treatment with sodium chloride in the preparation of sodium carbonate. This solution H is, therefore, further treated to provide a liquor which is closer to, and preferably at, the transition point S between sal soda, Glauber salt, and burkeite.

This further treatment comprises the manipulation of the solution with additional quantities of the complex or mixture of sodium carbonate and sodium sulfate at temperatures somewhat above the temperature used in the first stage of cooling for the crystallization of Glauber salt. The manipulation is preferably conducted by dissolving the additional quantities of the complex or mixture (burkeite) in the solution H at a temperature in the neighborhood of the transition temperature between sal soda, Glauber salt, and burkeite, the quantity of solids added being sufficient to saturate the solution therewith. Excess solids may be used to improve the dissolution rate and then separated, as by filtration or settling, from the solution. In practice, it may not be economical to provide sufficient retention time to secure a saturated solution, and in that case the quantity of solids added may be reduced accordingly and/or the retention time reduced.

When the solids comprise a mixture corresponding to about that of burkeite and the initial cooling temperature is between 20–25° C., we prefer a temperature between 26–30° C. for this second dissolution of solids. Obviously, the re-solution must be conducted at a temperature higher than was used in the first cooling step, and an optimum temperature resides somewhere just above the aforesaid transition temperature (26° C.), but even higher temperatures may be used with little decrease in efficiency.

The increase in temperature of the Glauber salt crystallization mother liquor (H) for the dissolution of further solids may be obtained in part at least from the heat of solution of the solids, as sodium carbonate and sulfate and their complexes have positive heats of solution. Generally, the solids needed to re-saturate the mother liquor will suffice to raise the temperature of the solution to about the transition temperature between sal soda, Glauber salt, and burkeite.

After the first mother liquor H has been re-saturated with the crude solids, the solution is cooled until saturation or supersaturation with sal soda is again reached. A second crop of Glauber salt forms during the cooling and is recovered. The resulting solution or mother liquor will have a higher ratio of carbonate to sulfate than the first mother liquor and will more closely approach the composition of the invariant point, i. e., the transition point S. It is, therefore, a much improved liquor for use in the preparation of sodium carbonate compounds. Additional improvement, with production of more Glauber salt, may be obtained by repetition of the re-saturation and Glauber salt crystallization steps, as often as desired to approach the optimum cold sulfate liquor composition S.

Instead of treating all of the initial Glauber salt crystallization mother liquor H with additional solids to enrich the solution, part of the liquor may be transferred to the initial solids dissolution step, replacing some of the water which would otherwise be used there. In that way, the initial solution of the solids will have a higher carbonate concentration and the mother liquor resulting from the crystallization of Glauber salt from the solution will also be higher in carbonate. In some cases, this procedure will suffice to produce a solution for the subsequent recovery of sodium carbonate, which is sufficiently close to the optimum solution S so that further enrichment of the solution may be omitted.

By crystallizing Glauber salt from a solution of sodium carbonate-sodium sulfate complexes or mixtures, re-saturating the end liquor with such complex and crystallizing a second crop of Glauber salt, the operation is effected more surely and more quickly than when carrying out the reaction as a sludge conversion. The elimination of the sludge conversion features and the substitution of the aforedescribed new steps makes practical the continuous operation of the process while producing cold sulfate liquor of high sodium carbonate content.

In a preferred process we employ salt mixtures consisting of what are termed "salt trap" salts and "clarifier" salts. The former contain about 60 percent sodium chloride, 20 percent sodium sulfate, and 10 percent sodium carbonate, while the latter contain about 40 percent sodium sulfate, 35 percent sodium carbonate, and 10 percent sodium chloride, the remainder in both cases being largely water with some insoluble matter. The "salt trap" salt comprises a mixture of common salt together with a small amount of sulfate-carbonate complex similar to burkeite. Clarifier salt contains a large proportion of the sulfate-carbonate complex, some sodium carbonate monohydrate, and some sodium chloride. The presence of sodium chloride is objectionable in the manipulation to produce Glauber salt and cold sulfate liquor. Hence, it is necessary to remove sodium chloride from the raw material to be employed, as for example by leaching. This leaching may be done with water or it may be accomplished by other solutions which may be available and which are unsaturated with sodium chloride.

We also have available considerable burkeite which is produced in other steps of the complete process, particularly during the steps leading up to the production of sodium carbonate. This burkeite may comprise true burkeite, i. e., the double salt, $Na_2CO_3.2Na_2SO_4$, and also various complexes of similar composition but containing other proportions of sodium carbonate and sodium sulfate. For the sake of simplicity and brevity, the utilization of true burkeite alone will be described.

To, for example, 1,000 pounds of this complex we add 1,869 pounds of water and stir the mixture while maintaining the temperature at about 30° C. In dissolving burkeite, the composition of the solution travels out from the origin at 30° C. along the line OG in Figure 2 to the point G. Other solids, complexes, or mixtures when dissolved will produce solutions which to all intents and purposes may be said to be saturated and may strike the line between $b$ and $a$ of Figure 1, or even between $b$ and $c$. During this operation, the temperature will rise as the process evolves heat, and cooling may be needed to control the temperature. At the point G (Figure 2), the solution weighs essentially 2869 pounds and has the following approximate composition:

|  | Pounds |
|---|---|
| $Na_2CO_3$ | 272 |
| $Na_2SO_4$ | 728 |
| $H_2O$ | 1,869 |

In this instance, no excess of burkeite is indicated as having been added to the specified quantity of water. In actual practice, it is common to add somewhat more than the 1,000 pounds of burkeite, say 5 percent excess, and to remove said excess by sedimentation, etc., after a reasonable length of time.

This solution (G) is then cooled to about 21–23° C., at which temperature it is essentially saturated with sal soda and Glauber salt, forming a liquor of composition H (Fig. 2); or the cooling may be carried to a slightly lower temperature to incur a metastable sal soda supersaturation forming a liquor of composition $H^1$. Glauber salt, weighing approximately 1,162 pounds, is precipitated upon cooling to saturation with sal soda (21°–23° C.) and is filtered or otherwise separated from the solution. This salt is given a light wash with cold water or other satisfactory liquor and then contains little sodium carbonate or other impurities. During the crystallization of Glauber salt the composition of the solution moves along the line GH to the point H in Figure 2, rather than in a direction parallel to the $Na_2SO_4$ axis, due to the removal of appreciable quantities of water, with $Na_2SO_4$ as $Na_2SO_4.10H_2O$. If the cooling process removes water evaporatively, then the slope of the line will be somewhat steeper, and the liquor will have a composition, at equilibrium, somewhat above point H on the line RS. While this is advantageous, for the sake of simplicity of exposition, we will describe the simpler case.

Also, under practical operating conditions, another factor which tends to move point H slightly upward toward S on the line RS is the presence of a small amount of solid burkeite in the original solution G. While it has previously been stated that any excess burkeite added during the dissolution step (O—G) is subsequently removed, at times the clarification is not perfect. Whereas large excesses of such solids resist conversion during the cooling step GH, we have found that the presence of a little solid burkeite is not deleterious and that such small excesses will decompose satisfactorily. Excesses amounting to an appreciable turbidity in the solution G have been found to convert satisfactorily, especially if the continuous cooling process be carried out in two stages, in the first of which saturation with respect to sodium carbonate is not reached. While any such conversion of solid burkeite is of value to the end in view, here again for simplicity the case of treating a clear solution of composition G will be used for exposition of the further steps of the invention. It is obvious to one skilled in such matters that, under conditions of equilibrium operation, anything that tends to move point H farther along toward point S demands that the cooling be stopped at a somewhat higher temperature, say 23°–24° C., instead of 21°–23° C.

The liquor of composition H remaining from the first Glauber salt crystallization is then manipulated with 195 pounds of additional burkeite at a temperature of about 27° C. The burkeite goes into solution and the solution composition moves along the line HI until it is saturated with burkeite. A small excess of solid burkeite may be allowed to remain in the liquor in this step also, though the quantity of such solids which may be converted to Glauber salt and solution by sludge conversion is less than in the previous digestion. The solution I is cooled to about 25.5° C.; a second crop of Glauber salt weighing about 153 pounds precipitates and is separated from the solution. This solution comprises the cold sulfate liquor which is used for the preparation of sodium carbonate. It weighs about 1,747 pounds and has the following approximate composition:

| | Pounds |
|---|---|
| Na$_2$CO$_3$ | 325 |
| Na$_2$SO$_4$ | 290 |
| H$_2$O | 1,132 |

The second dissolution of burkeite, i. e., the fortification of solution H, has been depicted on Figure 2 as having been accomplished by dissolving Na$_2$CO$_3$.2Na$_2$SO$_4$ in that liquor to the point of saturation I. It is understood that complexes of other ratios may be used for said fortification. In practice, we have found that during the fortification step the added complex may cause the composition of the solution to progress along a line parallel to the line H—I from the point H$^1$; rather than along the H—I. However, the slope of the line obtained upon re-dissolving such complexes is immaterial, so long as the solution can again be saturated with burkeite at a higher temperature.

Enrichment of the mother liquor by dissolving additional solids and crystallizing another crop of Glauber salt may be repeated as often as necessary to provide a final cold sulfate liquor which approaches the optimum equilibrium composition at the transition point S. The temperatures for optimum operation of the fortification step will vary slightly with the composition of the solids and with the composition of the medium in which the solids are dissolved. In general, the temperature will be close to and slightly above the transition temperature (which is 26.1° C. in pure solutions) say from 26 to 30° C. Small differences of temperature in this region of the solubility diagram are accompanied by marked changes in solubility, especially temperatures below 26° C.; temperatures above 26° C. are less critical. The optimum temperature can be determined in any case by drawing the solution composition path, representing usually the composition of the solids, through the starting solution composition point and identifying the temperature of the isotherm it intersects at which the sodium sulfate concentration is greatest. Equilibrium is approached only slowly in this step, as in any dissolution of solids in this system, and it is sometimes more economical to stop short of equilibrium and repeat the sequence of steps than to employ sufficient retention periods to reach equilibrium. The presence of impurities may also depress the equilibrium concentration and necessitate repetition of the steps.

By this process, burkeite or other mixture of sodium carbonate and sodium sulfate substantially free of sodium chloride, containing less sodium carbonate than sodium sulfate or not greatly more, is digested with water to precipitate Glauber salt and provide a solution containing the carbonate values in concentrated form in a series of dissolving and cooling steps rather than as a sludge conversion. The net result is the provision of a solution containing the carbonate values which more nearly approaches the optimum solution in a more readily controlled manner and at a more rapid rate.

In the prior Patent No. 1,836,426 it was recognized and set forth that complexes and mixtures containing appreciably more sodium carbonate than sodium sulfate, i. e., having a carbonate to sulfate ratio appreciably greater than unity, could be advantageously treated in a manner similar to that described in connection with the production of Glauber salt, with the exception that sal soda was recovered instead of Glauber salt. In a similar way, we find that the principles of our stepwise process of producing cold sulfate liquor and Glauber salt are applicable with advantage to the treatment of such carbonate rich complexes and mixtures. For example, to 1200 pounds of a complex containing 62.3 percent Na$_2$CO$_3$ and 21.0 percent Na$_2$SO$_4$, the remainder being water and insoluble matter, we add 1654 pounds of water. The mixture is stirred and maintained at about 35° C. until a solution is obtained. Means for cooling may be necessary as the reaction is exothermic. In dissolving, the composition of the solution follows along line O—Y of Figure 2 to a point Y saturated with respect to burkeite. The solution is then cooled to about 24.5° C., at which temperature it is essentially saturated with sal soda and Glauber salt, forming a solution of composition X; or the cooling may be carried to a slightly lower temperature to incur a metastable Glauber salt supersaturation, forming a liquor of composition X'. Sal soda weighing approximately 1237 pounds is precipitated and is filtered or otherwise separated from the solution.

The liquor of composition X is then manipulated with 84 pounds of additional complex at a temperature of about 27° C. The complex dissolves and the solution composition moves along the line X—W until it is saturated with burkeite. The solution W is cooled to about 26° C. and a second crop of sal soda weighing about 121 pounds precipitates and is recovered. The combined sal soda crops, totalling 1358 pounds on a dry basis and containing 502 pounds of $Na_2CO_3$, represents a direct recovery of approximately 63 percent of the sodium carbonate introduced. The remaining solution after the second sal soda crystallization is analogous to the cold sulfate liquor produced above.

The several variations including cooling to a point supersaturated with Glauber salt, carrying some undissolved solids with the liquors during the initial stages of the cooling, etc., described in principle in connection with the Glauber salt process are also applicable to high carbonate salt treatment.

Various means and methods may be employed to execute the process of this invention, but we have developed an arrangement of apparatus and a sequence of steps by which certain advantages are secured. We will describe this mode of carrying out the process steps of the invention, but it will be appreciated that such description does not prejudice our rights to protection on all methods employing the broader procedural steps. This description will be given with reference to the preparation of Glauber salt and cold sulfate liquor from burkeite, as in the previous example.

In the example, we have set forth the actual quantities of the several ingredients used and of the products and solutions obtained. Practically, we prefer to agitate an excess of solid burkeite with water in a dissolver 1 of Figure 3 and to remove the excess solids from the solution in a thickener 2 from which the excess solids are returned to the dissolver. Other means of securing the desired dissolution of crude solids and separation of the excess solids from the solution may be substituted for those shown.

An added feature of this process arises through our recognition that in practice the "burkeite" raw material may consist of more than one complex of $NA_2CO_3$ and $Na_2SO_4$. We have found that there can exist five or six separate complexes having varying ratios of $Na_2CO_3/Na_2SO_4$, and also that usually these complexes will be mixtures of several types rather than only one type. These separate complexes have been noted to exhibit different solubilities and rates of solution, some of them being appreciably more readily soluble than others. When such mixtures of $Na_2CO_3$—$Na_2SO_4$ complexes form the raw material for this process, we take advantage of the differences in the solubility characteristics of the several forms of complexes by treating the liquor from dissolver 1 with fresh complex, containing said desirable compounds. In this way, the most highly concentrated solution is formed. The less soluble, or less rapidly soluble ingredients pass out the bottom of the thickener 2, and are subsequently treated with fresh water to make a concentrated but not necessarily optimum solution. In the process shown in Figure 3 fresh burkeite is added both in the dissolver 1 and the thickener 2. Residues from both additions are returned to the dissolver. A complete countercurrent leaching process would also utilize these peculiarities of the system.

The solution leaving the thickener 2, prepared at 30° C., may be allowed to contain as much as 0.4 pound per gallon of undissolved, unsettled solids. It is then cooled to about 22° C., and Glauber salt caused to crystallize. The cooling and crystallization of Glauber salt may be conducted in any suitable manner, but we prefer to perform the cooling in stages so that the system is not maintained at the final low temperature throughout the entire operation. Stage or step-wise cooling of a liquor containing some suspended burkeite enables the solid undissolved burkeite to decompose in the first stage or stages, which is not the case when the cooling is accomplished in a single stage. This advantage arises because the liquors in the first stage crystallizer 3 of Figure 3, for example, are unsaturated with a $Na_2CO_3$ phase. Although there will be only small differences between the temperatures in crystallizers 3 and 4 of Figure 3, for example (as the overall drop is small), the effect is of measurable magnitude. Mother liquors containing the higher $Na_2CO_3$ concentrations are produced by this step-wise cooling and crystallization.

The overflow from the thickener 2 is introduced into the higher temperature unit 3 of a two-stage crystallizer, operating at 24.5° C. Solution, together with some precipitated Glauber salt is transferred from the high temperature stage 3 to the low temperature stage 4 operating at 22° C. From the latter unit the sludge is passed to filter 5, upon which Glauber salt is recovered essentially free of sodium carbonate or other impurities, except of course the inevitable mixed crystal. Mother liquor impurities are removed on the filter by application of a suitable wash spray. While such washing may, in practice, dilute the filtrate to some extent, this is of little consequence. In this novel process the liquor is to be re-saturated with burkeite and re-cooled, so that dilution effect is thereby corrected. In past practice, where it was necessary to wash the Glauber salt prior to passing it to refining steps, such dilution and consequent degradation of the cold sulfate liquor had to be accepted as a necessary evil.

The filtrate from the filter 5 has a composition approximately that of the point H in Figure 2. It has a sodium carbonate content considerably below that of the transition point S. To raise the sodium carbonate concentration and produce more Glauber salt, we mix this filtrate with burkeite, held at 27°–28° C., in dissolver 6. This is followed with thickener 7 in which all or most of the excess burkeite is removed. Clarified liquor which may contain some excess solids is transferred to crystallizer 8, in which the temperature is reduced to about 25°–26° C., and a second, small crop of Glauber salt precipitated.

The mother liquor from this final Glauber salt crystallization is the cold sulfate liquor from which sodium carbonate is recovered, and, as has been noted above, any dilution thereof reduces the efficiency of the carbonate recovery. For this reason, we separate most of the cold sulfate liquor from the second Glauber salt crop without washing, as for instance in a gravity settler 9. Clarified cold sulfate liquor is withdrawn as an overflow from the settler 9 and goes direct to the sodium carbonate process without dilution. A sludge of Glauber salt with some cold sulfate liquor is withdrawn from the bottom of the settler and transferred directly to the first of the multi-stage crystallizers. Returning this sludge to the first-stage crystallizer 3 has the advantage of removing by dissolution in the less concentrated liquor and by virtue of the greater retention time, any undissolved burkeite. Less equipment is needed also as all of the Glauber salt is then recovered from the system on one filter 5 where washing may be done without fear of the consequences.

Other methods of handling the Glauber salt from the cone of the settler 9 may be used, so long as no dilute liquor is added to the cold sulfate liquor. For example, an additional filter (equipped for washing, if desired) may be provided and the filtrate added to the solution entering the dissolver 6.

The arrangement of apparatus and sequence of steps shown is especially useful in providing the desired optimum cold sulfate liquor. A continuous flow of solids enters the system and Glauber salt and cold sulfate liquor are continuously removed from it, and these results are accomplished in a manner to make the most of the several features of our invention. It is understood, however, that many modifications and changes may be made without departing from the principles of the invention, and this invention covers all such modifications and changes as come within the scope of the appended claims.

We claim:

1. A process of preparing Glauber salt, which comprises crystallizing Glauber salt from an aqueous solution by cooling the solution to a temperature below the transition point between Glauber salt, sal soda, and burkeite, which aqueous solution contains sodium sulphate and sodium carbonate with a ratio of sulphate to carbonate greater than unity and sodium sulphate in such concentration as will cause Glauber salt to crystallize during the cooling operation, separating the Glauber salt from the resulting mother liquor, thereafter dissolving a complex of sodium sulphate and sodium carbonate having a ratio of sulphate to carbonate greater than unity in the resulting mother liquor at a higher temperature, and again cooling the resulting solution to crystallize Glauber salt at a temperature below said transition point but higher than the temperature employed in the first-mentioned cooling operation while throughout the process maintaining the solution and liquor unsaturated with respect to sodium chloride.

2. A process of preparing Glauber salt, which comprises crystallizing Glauber salt from an aqueous solution at a temperature below the transition point between Glauber salt, sal soda, and burkeite, which aqueous solution contains sodium sulphate and sodium carbonate with a ratio of sulphate to carbonate greater than unity and a concentration of sodium sulphate such as will cause Glauber salt to crystallize during the cooling operation, separating the Glauber salt from the resulting mother liquor, thereafter dissolving a complex of sodium sulphate and sodium carbonate having a ratio of sulphate to carbonate greater than unity in said mother liquor at a temperature relatively close to but above said transition point, and cooling the resulting solution to a temperature below said transition point to again crystallize Glauber salt but higher than the temperature at which the first crop of Glauber salt was crystallized while maintaining throughout the process the solution and liquor unsaturated with sodium chloride.

3. A process of crystallizing Glauber salt while producing a final mother liquor approaching the composition of a solution at the transition point between burkeite, Glauber salt, and sal soda, which process comprises cooling an aqueous solution to crystallize Glauber salt at a temperature below the transition point between burkeite, Glauber salt and sal soda, which aqueous solution contains sodium sulphate and sodium carbonate with a sulphate to carbonate ratio greater than unity and in such concentrations as will cause the mother liquor produced to be saturated with Glauber salt and essentially saturated with sal soda, separating the Glauber salt from the resulting mother liquor, thereafter dissolving a complex of sodium sulphate and sodium carbonate in said mother liquor at a temperature somewhat above said transition point, which complex contains a sulphate to carbonate ratio greater than unity, and cooling the resultant solution to crystallize Glauber salt at a temperature below said transition point but above the first-mentioned cooling temperature so as to produce a mother liquor saturated with Glauber salt and essentially saturated with sal soda and as compared with said first produced mother liquor more nearly corresponding to the composition of said transition point solution, while maintaining the solution and liquor throughout the process unsaturated with sodium chloride.

4. A method of treating complexes of sodium carbonate and sodium sulphate essentially free of sodium chloride and having a sulphate to carbonate ratio greater than unity, which comprises forming a concentrated aqueous solution of said complexes at a temperature between the transition point between Glauber salt, sal soda, and burkeite and about 35° C., thereafter cooling the solution to a temperature somewhat below said transition point while crystallizing Glauber salt only, separating the Glauber salt from the mother liquor, dissolving further quantities of the complex in the mother liquor at a higher temperature, again cooling the resulting solution to a temperature below the temperature of said transition point but above the temperature of the aforesaid first cooling, to cause crystallization of Glauber salt and to form a second mother liquor having a higher percentage of sodium carbonate than the first mother liquor produced.

5. A process of treating complexes of sodium carbonate and sodium sulphate in which the sulphate to carbonate ratio is greater than about unity to crystallize Glauber salt and produce a solution approaching the composition of a solution at the transition point between Glauber salt, sal soda, and burkeite, which process comprises dissolving the complex to form a concentrated aqueous solution at a temperature above the transition point between Glauber salt, sal soda, and burkeite, cooling the solution below said transition point to crystallize Glauber salt and produce a mother liquor essentially saturated with sal soda, separating the Glauber salt from the mother liquor, again dissolving further quantities of said complex in the mother liquor at a temperature above said transition point, cooling the solution to a temperature below said transition point but above the temperature of the preceding cooling step, removing the precipitated Glauber salt, and repeating the aforesaid operations until the composition of the final mother liquor approximates the composition of a solution at said transition point, while throughout the process maintaining the solution and liquor unsaturated with sodium chloride.

6. A process of treating complexes of sodium carbonate and sodium sulphate for crystallizing one of said ingredients only while producing a solution approaching the composition of a solution at the transition point between burkeite, Glauber salt, and sal soda, which process comprises dissolving said complex in an aqueous medium to produce a concentrated solution at a temperature above the transition point between burkeite, Glauber salt, and sal soda, cooling the solution below said transition point to crystallize one of the components as a hydrated salt, separating the hydrated salt from the resulting mother liquor, dissolving further complex in the mother liquor at a higher temperature, cooling the resulting solution again to a temperature below said transition point but above the temperature of the preceding cooling step, and further crystallizing said component so that the composition of the mother liquor from said second crystallizing operation approaches more nearly the composition of a solution at the said transition point than the mother liquor resulting from the first-mentioned crystallizing operation, while throughout the process maintaining the solution and liquor unsaturated with sodium chloride.

7. A process of treating a complex containing sodium sulphate and sodium carbonate and substantially free of sodium chloride to crystallize one only of said components while forming a solution approaching the composition of a solution at the transition point between burkeite, Glauber salt, and sal soda, which process comprises dissolving a part of the complex in an aqueous medium until a concentrated solution is formed, cooling the solution to a temperature below the transition point between burkeite, Glauber salt, and sal soda to crystallize one of said components and produce a solution essentially saturated with both components, separating the crystallized component, and repeating the operations of dissolving said complex and cooling to crystallize said component using the mother liquor from the previous operation as the dissolving medium in each succeeding operation under conditions so that the mother liquor resulting from each succeeding operation more nearly approximates the composition of the solution at said transition point.

8. The process of preparing Glauber salt, which comprises cooling an aqueous solution to crystallize only a solid phase of Glauber salt at a temperature below the transition point between burkeite, Glauber salt and sal soda, but above 21.5° C. which aqueous solution contains sodium sulphate and sodium carbonate with a sulphate to carbonate ratio greater than unity and in such concentration of sodium sulphate as will cause Glauber salt to crystallize during the cooling, separating the Glauber salt and mother liquor, thereafter dissolving a complex of sodium carbonate and sodium sulphate in said first mother liquor at a temperature above 26° C. and below 35° C., which complex contains a sulphate to carbonate ratio greater than unity, cooling the resultant solution and again crystallizing Glauber salt at a temperature above 21.5° C. but below 26° C., settling the latter Glauber salt from this second mother liquor to recover a solution higher in sodium carbonate than said first mother liquor, free of dilution and approaching the composition of the solution at the aforesaid transition point, while maintaining the solution and liquors throughout the process essentially free of sodium chloride.

9. The process of preparing Glauber salt, which comprises cooling an aqueous solution to crystallize only a solid phase of Glauber salt at a temperature below the transition point between burkeite, Glauber salt and sal soda, which aqueous solution contains sodium sulphate and sodium carbonate with a sulphate to carbonate ratio greater than unity and in such concentration of sodium sulphate as will cause Glauber salt to crystallize during the cooling, separating the Glauber salt and mother liquor, thereafter dissolving a complex of sodium carbonate and sodium sulphate in said first mother liquor at a temperature above said transition point, which complex contains a sulphate to carbonate ratio greater than unity, cooling the resultant solution and again crystallizing Glauber salt at a temperature below said transition point, settling the latter Glauber salt from this second mother liquor to recover a solution higher in carbonate than said first mother liquor, free of dilution and approaching the composition of the solution at the aforesaid transition point, and adding the settled Glauber salt with adhering mother liquor to the solution in the first crystallization step while maintaining the solution and liquors unsaturated with sodium chloride throughout the process.

10. A process of treating complexes of sodium carbonate and sodium sulfate by crystallizing one of said ingredients only while producing a solution approaching the composition of the solution at the transition point saturated with burkeite, Glauber salt and sal soda, which process comprises dissolving said complex in an aqueous solution and producing a concentrated solution thereof, cooling the solution to a temperature below the said transition point between burkeite, Glauber salt and sal soda but above saturation with one of said components, and crystallizing out the second of said components as a hydrated salt, cooling said solution further to saturation with said first component while continuing to crystallize said second component as a hydrated salt, separating the crystallized second component from the liquor, dissolving further complex in said liquor at a higher temperature than said last cooling temperature, cooling the resulting solution to a temperature below said transition point and below saturation with said second component and further crystallizing said second component as a hydrated salt so that the mother liquor from said final crystallizing operation approaches more nearly the composition of the solution at said transition point than the mother liquor from the previous crystallizing operations while maintaining the solution and liquors unsaturated with sodium chloride throughout the process.

LEROY G. BLACK.
ELLIOTT BRYANT FITCH.
HENRY BRUNO SUHR.